(12) United States Patent
Chattot et al.

(10) Patent No.: US 9,787,097 B2
(45) Date of Patent: Oct. 10, 2017

(54) ELECTRIC POWER SUPPLY NETWORK LINKED TO A TRANSPORT SYSTEM

(71) Applicant: SIEMENS S.A.S., St. Denis (FR)

(72) Inventors: Eric Chattot, Meudon (FR); Laurent Cloutot, Killwangen (CH); Valérie Cornetet, Cheuvreuse (FR); Nicolas Urien, Paris (FR)

(73) Assignee: SIEMENS S.A.S, St. Denis (FR)

( * ) Notice: Subject to any disclaimer, the term of this patent is extended or adjusted under 35 U.S.C. 154(b) by 453 days.

(21) Appl. No.: 14/400,040

(22) PCT Filed: Apr. 19, 2013

(86) PCT No.: PCT/EP2013/058167
§ 371 (c)(1),
(2) Date: Nov. 10, 2014

(87) PCT Pub. No.: WO2013/182343
PCT Pub. Date: Dec. 12, 2013

(65) Prior Publication Data
US 2015/0097423 A1    Apr. 9, 2015

(30) Foreign Application Priority Data
Jun. 5, 2012   (EP) .................................... 12290186

(51) Int. Cl.
*B60L 11/18*   (2006.01)
*H02J 3/32*   (2006.01)
*H02J 3/00*   (2006.01)

(52) U.S. Cl.
CPC ............. *H02J 3/32* (2013.01); *B60L 11/1809* (2013.01); *H02J 3/008* (2013.01); *Y04S 50/10* (2013.01)

(58) Field of Classification Search
USPC ........................................................ 700/275
See application file for complete search history.

(56) References Cited

U.S. PATENT DOCUMENTS 8,441,151 B2   5/2013 Huang
2003/0230994 A1*  12/2003 Seddiki .................... B60L 9/00
318/432

(Continued)

FOREIGN PATENT DOCUMENTS

TW   201124831 A   7/2011

*Primary Examiner* — Rexford Barnie
*Assistant Examiner* — Xuan Ly
(74) *Attorney, Agent, or Firm* — Laurence Greenberg; Werner Stemer; Ralph Locher

(57) ABSTRACT

An electric power supply network includes at least one connection point with an upstream electrical network delivering useful power to at least one input of a first electric power supply network of an electrically powered transport system, such as trolley buses, trams, metro, train, or other transport, the first electrical network presenting peak power fluctuations as a function of variable energy needs depending on traffic associated with the transport system. The first electrical network includes at least one power output capable of distributing energy, in particular recovered from the transport system and from the upstream electrical network, to at least a second electrical network, enabling energy to be supplied to electrical consumption points. At least one supervision unit monitors distribution of energy from the power output whenever at least the peak power required by the first transport system is below the useful power available upstream.

19 Claims, 3 Drawing Sheets

(56) References Cited

U.S. PATENT DOCUMENTS

| | | |
|---|---|---|
| 2009/0048716 A1 | 2/2009 | Marhoefer |
| 2011/0109165 A1 | 5/2011 | Hahn et al. |
| 2011/0204720 A1* | 8/2011 | Ruiz ................... B60L 11/1816 307/66 |

* cited by examiner

ELECTRIC POWER SUPPLY NETWORK LINKED TO A TRANSPORT SYSTEM

BACKGROUND OF THE INVENTION

Field of the Invention

The present invention relates to an electric power supply network, in particular linked to a transport system, including at least one connection point with an upstream electrical network delivering useful power to at least one input of a first electric power supply network of an electrically powered transport system, such as trolley buses, trams, metro, trains, or other transport, the first electrical network presenting peak power fluctuations as a function of variable energy needs depending on traffic associated with the transport system.

An electrically powered urban mass transport system, such as trolley buses, trams, metro, train or other guided or driven types of transport, is characterized by very intermittent operation with peaks of electricity consumption at rush hours and slack periods for which the electric power supply network of said transport system is in little demand. Despite the great differences between consumption peaks and troughs, the electric power supply network must still necessarily be sized to meet a maximum transport system capacity so as to satisfy the operating constraints on a permanent basis.

The capacity of the transport system electricity network is either predictable, through a knowledge of the timetables, or measurable in real time through measuring devices linked to the traffic in the transport system.

At present, transport system operators are aiming to minimize energy costs, which are reflected in two factors: subscription and consumption. Subscription depends greatly on the maximum capacity required of an electric power supply network upstream of the transport system's own electrical network. The power taken as consumption can be controlled by regulating the traffic and recovering vehicle braking energy. Other methods aim to store surplus energy, for example in slack periods, for example in batteries or super-capacitors, in order to restore this stored energy during the traction phase and at rush hours. In this way, the transport system operator is able perceptibly to optimize energy management and thus reduce the cost of its contract with an upstream electrical energy distributor.

Finally, on the known model of "Smart Grids", it is now possible for energy distributors such as EDF in France, under certain conditions, to redistribute surplus energy originating from a local base network to consumers external to said local network. This contractual principle is applied for example for private solar collection installations with a potential energy surplus. In the case of a transport system, the surplus power of the electric power supply network of said system is, however, by its nature, intermittent and of greatly variable intensity, which is difficult for an energy distributor such as EDF to absorb. It is preferable for the operator to favor reuse within the transport system.

BRIEF SUMMARY OF THE INVENTION

An object of the present invention is to propose an electric power supply network capable of providing for more economical management of an electrical network linked to a transport system, by enabling an operator of said system to control this management independently owing to its direct knowledge of the status of the transport system.

Finally, a transport system of course includes vehicles, but also equipment, stations and other peripherals serving said system. The object of the present invention set out above thus also extends to the most economical management of an electrical network supplying at least such equipment, stations and other peripherals, also by ensuring that an operator of said system can control this management independently owing to its direct knowledge of the status of the transport system and said equipment.

In this respect, the present invention thus proposes an electric power supply network as described below.

On the basis of an electric power supply network including at least one connection point with an upstream electrical network (such as a traditional electrical distribution network like that of EDF) delivering useful power to at least one input of a first electric power supply network of an electrically powered transport system such as trolley buses, trams, metro, train, or other transport managed by an operator, said first electrical network presenting peak power fluctuations as a function of the variable energy needs depending on the traffic associated with the transport system, the invention provides that said electrical network is characterized in that:—the first electrical network includes at least one power output capable of distributing energy, in particular recovered from the transport system (recovery, storage, etc.) and from the upstream electrical network (for example and above all in a surplus energy phase), to at least a second electrical network enabling energy to be supplied to electrical consumption points such as in particular equipment, stations and other peripherals of said transport system and commonly also called "consumers" subsequently,—at least one supervision unit monitors, under the control of the operator, the distribution of energy from said power output whenever at least the peak power required by the first transport system is below the useful power available upstream.

A considerable advantage of the network according to the invention is that the operator of the transport system can, by means of the supervision unit, taking account of the scale of the energy required of said system, redistribute surplus energy to different consumers, in particular outside the first network linked to the transport system, like a tap which can be turned on and off. Contractually, the operator retains a contract with the upstream electrical network distributor assuring sufficient maximum energy supply capacity, which generally exceeds the minimum energy requirements. During periods when the energy network of the transport system is locally or globally in energy surplus or even during periods when the power taken is less that the rated contract capacity, this energy can be redistributed or resold to consumers and/or to storage means internal or external to the first electrical network.

If the operator modifies operating conditions or parameters of its transport system as a function of the transport requirements, the supervision unit detects that the associated energy requirements are different and automatically adapts the redistribution of energy via the power output.

Furthermore, it is also easily possible for the operator manually to adapt control criteria of the supervision unit. This can be done as a function of specific requirements on its transport system or of the second electrical network if a consumer's energy input has to be given priority.

All these aspects thus make the transport system operator independent in managing most economically its actual energy requirements to be guaranteed and the redistribution of surplus energy. From a contractual point of view, if the operator actually uses 70% of the maximum capacity of the energy distributor network, it can, in addition to the redistribution of surpluses, use the remaining 30% of capacity to supplement deliveries to third consumers.

BRIEF DESCRIPTION OF THE SEVERAL VIEWS OF THE DRAWING

A set of sub-claims presents advantages of the invention, these being described by means of exemplary embodiments and applications provided using the figures described below:

DESCRIPTION OF THE INVENTION

Figure 1:
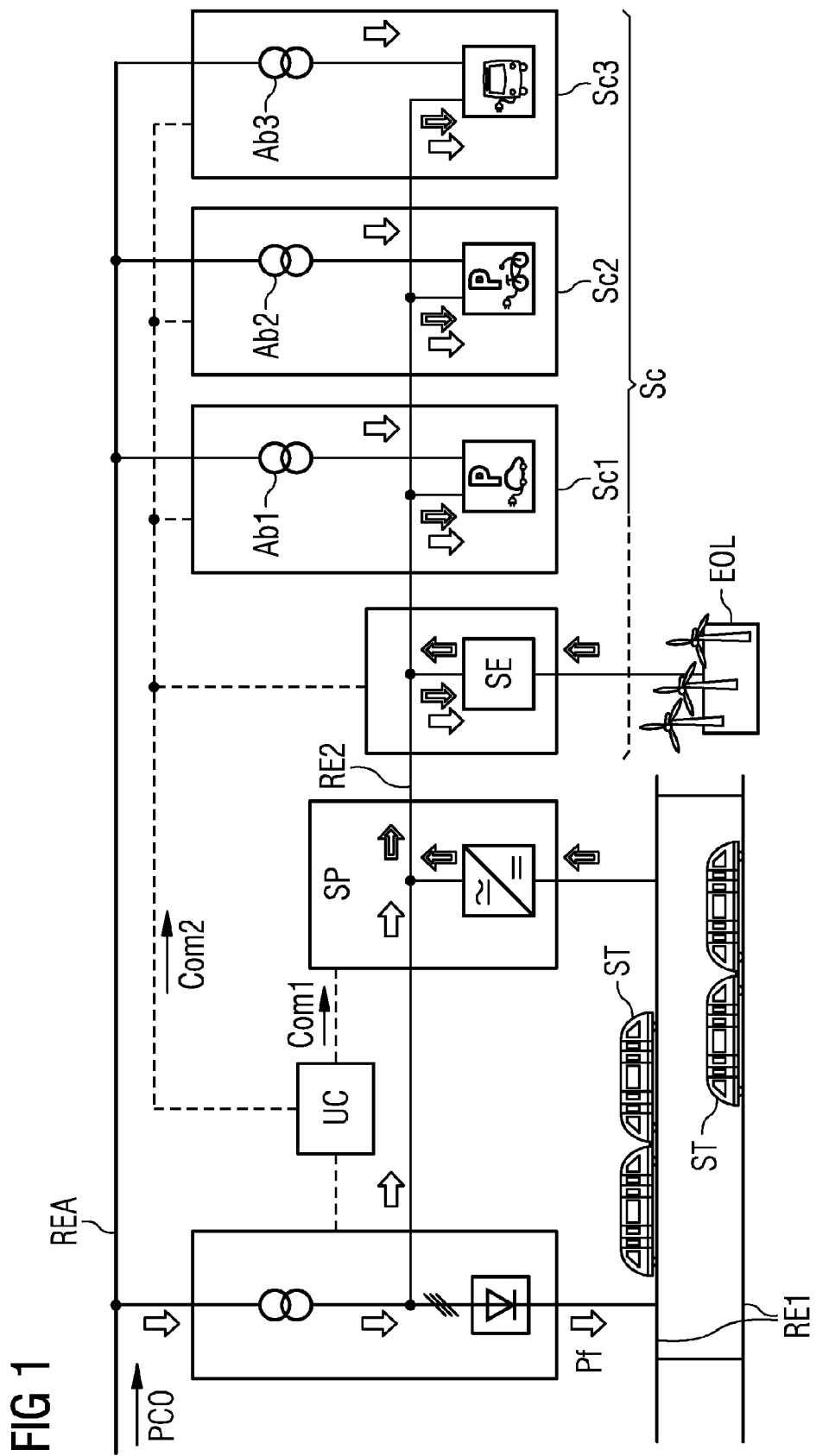
FIG. 1 Exemplary embodiment of an electric power supply network according to the invention, FIG. 2 Block diagram of an electric power supply network according to the invention with a consumer additional to the transport system, FIG. 3 Block diagram according to FIG. 2 with a supplementary storage means, FIG. 4 Block diagram according to FIG. 3 with supplementary consumers and their base/subsidiary supplies, two sources of useful power delivered and two power outputs, FIG. 5 Block diagram according to FIG. 2 with two sources of useful power delivered to two transport systems coupled to one power output.

FIG. 1 presents an exemplary embodiment of an electric power supply network according to the invention including at least one connection point (PCO) with an upstream electrical network (REA) delivering useful power (Pf) to at least one input of a first electric power supply network (RE1) of an electrically powered transport system (ST) such as trolley buses, trams, metro, train, or other transport, said first electrical network (RE1) presenting peak power fluctuations as a function of the variable energy needs depending on the traffic associated with the transport system. The electric power supply network according to the invention is characterized in that:—the first electrical network (RE1) includes at least one power output (SP) capable of distributing energy, in particular recovered from the transport system (ST) and from the upstream electrical network (REA), to at least a second electrical network (RE2), enabling energy to be supplied to electrical consumption points commonly called "consumers" (Sc, SE, Sc1, Sc2, Sc3, etc.),—at least one supervision unit (UC) monitors the distribution of energy from said power output (SP) whenever at least the peak power required by the first transport system (ST) is below the useful power (Pf) available upstream from the network (REA).

Under the control of the transport system operator, the supervision unit (UC) controls, dynamically or according to a pre-established pattern, at least one distribution of energy via the power output (SP), thus providing for regulation of a general (Com1) or individual (Com2) power supply to at least one of the electrical consumption points (SC1, SC2, SC3) by direct supply or via an intermediate storage means (SE), which may be compared to a reversible consumer (stores and delivers energy upon request from the supervision unit and/or the requirements of other consumers). The storage means (SE) can also be supplied with a source of renewable and/or intermittent energy (EOL) such as the wind farm shown in FIG. 1 contributing to supplying energy in addition to the surpluses originating from the first electrical network to the storage means (SE). Thus, by recovering, upstream, in the storage means (SE) all the supplies of renewable/intermittent energy and all the "under-used" energy surpluses, it is possible to obtain quasi-continuity of electric power supply to the consumers (Sc1, Sc2, Sc3) downstream of the storage means (SE), so as to avoid using base supplies (Ab1, Ab2, Ab3) for these consumers, said base supplies being themselves associated with additional contractual/physical costs for an energy distributor. The electric power supply network according to the invention thus adopts a preferred mode of regulation of general (Com1) or individual (Com2) supply by maximizing a supply of energy to the consumers originating from the power output (SP) or from the storage means (SE) so as to minimize the supplies of additional energy external to the second electrical network (RE2).

Depending on the type of storage desired or the needs of consumers downstream of the storage, the storage means (SE) can advantageously include an accumulator such as a battery, a super-capacitor, an inertia wheel or a hybrid means of electrical accumulation.

One of the points (Sc1, Sc2, Sc3) of electrical consumption can be a recharging station for accumulators, in particular accumulators of the on-board and/or removable type for means of transport or a recharging station for an electric road vehicle such as a bicycle (Sc2), a scooter, a car (Sc1), a van or a bus (Sc3). By these examples, the electric power supply network according to the invention thus provides highly advantageously, on the basis of completely recoverable energy surpluses from the first network (RE1) linked to the transport system (ST), for quasi-permanent energy supply to other systems or fleets of different kinds of electrical transport on the periphery of the transport system (ST). Furthermore, the points of electrical consumption can be many and varied types of equipment such as a travelator, an escalator, or other electrical equipment (gate, signaling, air conditioning, etc.), in particular for transport system stations.

In a flexible manner, the supervision unit (UC) can be either centralized at a central control point, or distributed over the first electrical network (RE1) depending on points of detection of surplus energy recoverable through point(s) of connection to the upstream network(s) (REA).

A preferred power output (SP) may include a single transformer in a transport system sub-station providing for dc/ac conversion between the first and the second network (RE1, RE2). The power output is of course coupled or at least controlled by the supervision unit (UC), in particular in order to provide for regulation of the energy flow to the second electrical network (RE2).

The electric power supply network according to the invention can provide that the first electrical network (RE1), the second electrical network (RE2), a storage means (SE) and/or the points of electrical consumption (Sc) are coupled to sources of intermittent and/or renewable energy (EOL), the energy supplied from which is distributed under the control of the supervision unit (UC). In this way, the energy independence of the network according to the invention is further increased as a function of the real/actual needs of the consumers.

Figure 2:
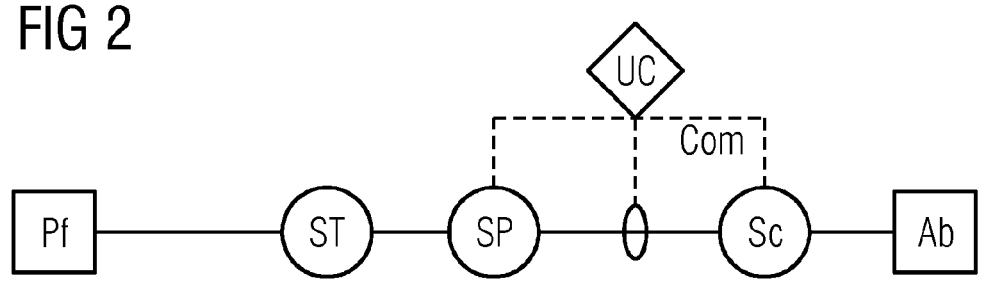

FIG. 2 presents a basic block diagram of an electric power supply network according to the invention (such as that in FIG. 1) with a single consumer (Sc) attached to the transport system (ST). The transport system (ST) receiving useful power (Pf) and having an installed power capacity exceeding the needs of said transport system and/or generating surplus energy able to provide power via the power output (SP) controlled (Com) by means of a supervision unit (UC) to a point of consumption (Sc) in addition to or ideally instead of a base power supply (Ab) independent of said point of consumption.

Figure 3:
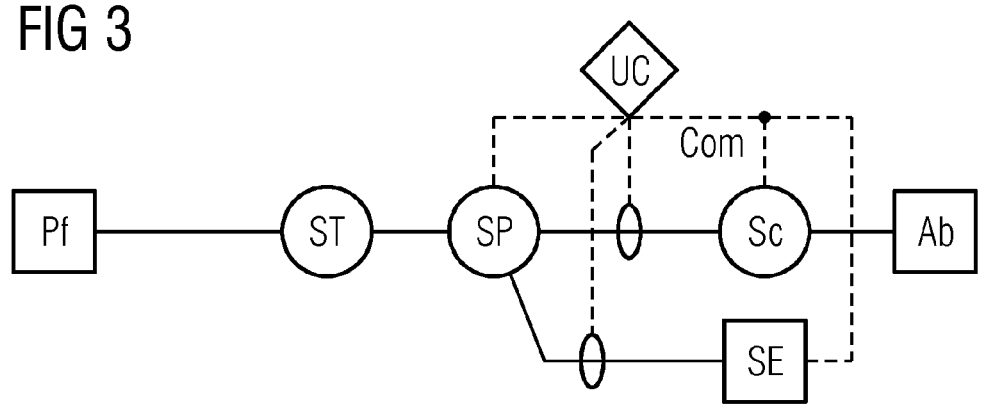

FIG. 3 presents another block diagram according to FIG. 2 with an additional storage means (SE). Here, the storage means is controlled (Com) by the supervision unit (UC) either identically to the consumer (Sc) or individually, and in parallel with the consumer (Sc), at least for one charge phase with energy originating from an installed power capacity exceeding the needs of said transport system (ST).

Reversibly, the supervision unit (UC) can also control discharge of the storage means (SE), thus making it itself a source of energy for the other consumer (Sc) so as to make it independent of another external source of energy (Ab) upstream of the second (and first) electrical network via the power output (SP).

Figure 4:
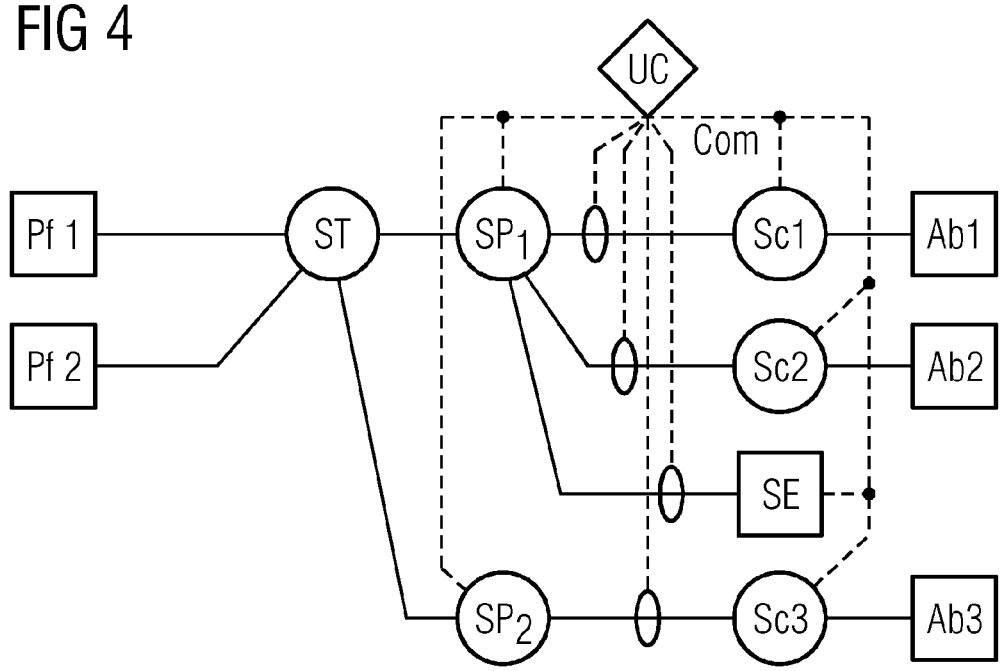

FIG. 4 presents a block diagram according to FIG. 3 with additional consumers (Sc1, SC2, Sc3) and their base/subsidiary power supplies (Ab1, Ab2, Ab3), two connection points as sources (Pf1, Pf2) of useful power delivered to the transport system (ST) comprising two power outputs (SP1, SP2). In comparison with FIG. 3, the power output (SP) is made up of several distribution points (SP1, SP2), being in particular coupled to at least one point of electricity consumption (Sc1, Sc2, Sc3) and/or a storage means (SE).

Figure 5:
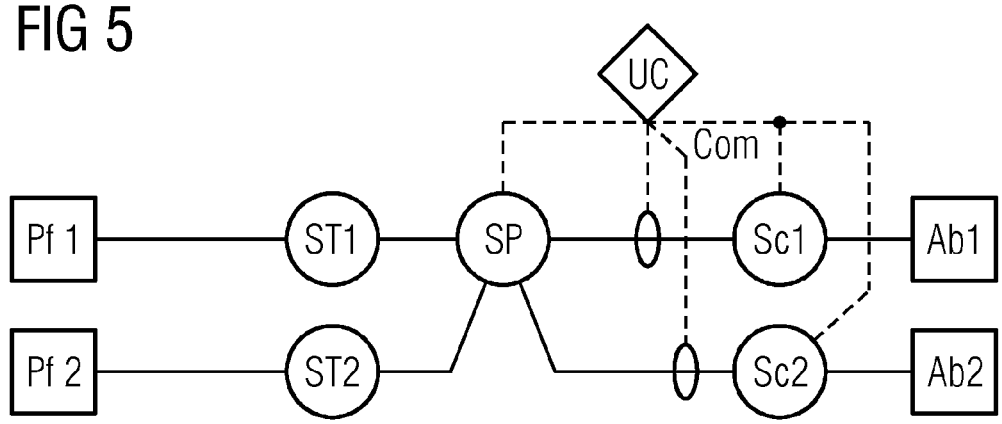

FIG. 5 finally presents a block diagram according to FIG. 2 with two connection points as sources (Pf1, Pf2) of useful power respectively delivered to each of two transport systems (ST1, ST2) coupled to a power output (SP). In this way, a double energy surplus can be centrally recovered and redistributed to at least one of the two consumers (Sc1, Sc2). More generally, a single power output (SP) can be coupled electrically to several electrically powered transport systems (ST, ST1, ST2, etc.), said transport systems each being able to be individually supplied with useful power (Pf1, Pf2, etc.). The electric power supply network according to the invention can thus be extended to several transport systems, ideally with common equipment or stations or more generally being close together.

In order to improve the management of energy and, by extension to the examples in the figures concerned, a point of electricity or storage (Sc, Sc1, Sc2, Sc3, SE) can thus be coupled directly or otherwise indirectly to several points of energy distribution, such as:—a power output (SP, SP1, SP2),—an output from another storage means, such as a storage means associated with an intermittent energy source (EOL),—an output from a base power supply (Ab, Ab1, Ab2, Ab3)—and/or an output from an intermittent and/or renewable energy source (EOL).

Finally, a preferred embodiment of the electric power supply network according to the invention is also obtained when a base power supply (Ab, Ab1, Ab2, Ab3) of a point of consumption is a subsidiary power supply with one or more intermittent or renewable energy sources supplying the point of consumption. Ideally in this embodiment, upstream of the second network, surplus energy from the base power supply (Ab, Ab1, Ab2, Ab3) is redistributed to a storage means (SE), in the case of energy supply from an intermittent or renewable energy source. In this light, and according to the example in FIG. 1, this means that a distribution network supplying a bus transport system "consumer" (Sc3) could reverse surplus energy to the storage means (SE) if there is a surplus on the electrical network associated with the bus transport system "consumer" (Sc3) owing to a sufficiency of power supply from an intermittent or renewable energy source specific to said bus transport system (for example solar collectors at a station).

The invention claimed is:

1. An electric power supply network, comprising:
   a first electrical power supply network of an electrically powered transport system;
   a second electrical power supply network being independent of said first electrical power supply network;
   said first electrical power supply network presenting peak power fluctuations as a function of variable energy needs depending on traffic associated with the transport system, said first electrical power supply network having at least one input and at least one power output configured to distribute energy to at least said second electrical power supply network, enabling energy to be supplied to electrical consumption points;
   at least one connection point to an upstream electrical network delivering useful power to said at least one input of said first electrical power supply network; and
   at least one supervision unit controlling the distribution of energy from said power output to said second electrical power supply network whenever at least a peak power required by the transport system is below a useful power available upstream.

2. The network according to claim 1, wherein the electrically powered transport system includes trolley buses, trams, subways, trains or other transport.

3. The network according to claim 1, wherein the energy distributed by said at least one power output of said first electrical power supply network is recovered from the transport system and from said upstream electrical network.

4. The network according to claim 1, wherein said supervision unit controls, dynamically or according to a pre-established pattern, at least one distribution of energy through said power output, providing for regulation of a general or individual power supply to at least one of the electrical consumption points by direct supply or though an intermediate storage device.

5. The network according to claim 4, wherein said intermediate storage device includes an accumulator.

6. The network according to claim 5, wherein said accumulator is a battery, a super-capacitor, an inertia wheel or a hybrid electrical accumulation device.

7. The network according to claim 1, wherein one of the electrical consumption points is a recharging station for accumulators.

8. The network according to claim 1, wherein one of the electrical consumption points is a recharging station for at least one of on-board or removable accumulators for transport devices or a recharging station for an electric road vehicle including a bicycle, a scooter, a car, a van or a bus.

9. The network according to claim 1, wherein the electrical consumption points are selected from the group consisting of a moving sidewalk, an escalator and other electrical equipment.

10. The network according to claim 9, wherein the other electrical equipment are provided for transport system stations.

11. The network according to claim 1, wherein said at least one supervision unit is centralized at a central control point or distributed over said first electrical power supply network.

12. The network according to claim 1, wherein at least one of said first electrical power supply network, said second electrical power supply network, a storage device or the electrical consumption points are coupled to at least one of intermittent or renewable energy sources, and energy supplied therefrom is distributed under control of said at least one supervision unit.

13. The network according to claim 1, wherein said power output is coupled electrically to several electrically powered transport systems each being able to be individually supplied with useful power.

14. The network according to claim 1, wherein said power output includes several distribution points.

15. The network according to claim 14, wherein said distribution points are coupled to at least one of at least one electrical consumption point or a storage device.

16. The network according to claim 1, wherein an electrical consumption or storage point is coupled directly or indirectly to several energy distribution points.

17. The network according to claim 16, wherein the energy distribution points include at least one of a power output, an output from another storage device or a storage device associated with an intermittent energy source, a base power supply output or an output from at least one of an intermittent or renewable energy source.

18. The network according to claim 17, wherein the base power supply is a subsidiary power supply with intermittent energy sources.

19. The network according to claim 18, wherein energy is being input from an intermittent energy source and surplus energy from the base power supply is redistributed to a storage device.

* * * * *